Patented Aug. 1, 1933

1,920,406

UNITED STATES PATENT OFFICE 1,920,406

PROCESS OF PREPARING DERIVATIVES OF NAPHTHALENE-1.4.5.8-TETRACARBOXYLIC ACID

Georg Kränzlein and Heinrich Vollmann, Frankfort-on-the-Main-Hoechst, Germany, assignors to General Aniline Works, Inc., New York, N. Y., a Corporation of Delaware No Drawing. Application July 17, 1931, Serial No. 551,558, and in Germany August 14, 1930

5 Claims. (Cl. 260—124)

The present invention relates to a process of preparing derivatives of naphthalene-1.4.5.8-tetracarboxylic acid.

We have found that derivatives of naphthalene-1.4.5.8-tetracarboxylic acid are obtainable by treating in a suitable manner with cuprous cyanide a compound of the general formula:

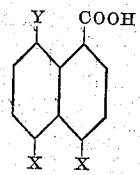

wherein Y stands for a halogen atom one X represents a carboxylic acid group and the other X represents a halogen atom. The reaction occurs only if at least one of the two components is present in a dissolved state. It is, therefore, necessary to add to the reaction mixture an agent capable of dissolving at least one of the reaction components. As such agents there may be used, for instance, organic solvents such as pyridine, quinoline, benzyl cyanide, which dissolve the naphthalene compound, or an aqueous solution of alkali metal cyanides or alkali metal halides which dissolves the cuprous cyanide by the formation of soluble complex salts.

The reaction is carried out while heating. In some cases it is advantageous to use a closed vessel.

Instead of cuprous cyanide there may also be used nickelous cyanide and instead of a naphthalene carboxylic acid of the above formula, a reactive derivative thereof such as, for instance, an amide, a nitrile, an ester, of the aforesaid acid or the like. All these substitute products are to be considered as equivalent substances in the light of the present invention and they are understood to be comprised in the appended claims.

The reaction, for instance, probably takes the following course:

The intermediate products obtainable by this reaction (the dicyano-dicarboxylic acids and the tetracarboxylic acid diamides) need not be isolated; by working, for instance, in the manner described in the examples, the di-imide of the tetracarboxylic acid may be obtained directly. The yield of di-imide amounts to above 70% of that of the theory. The α-α-dihalogen-naphthalene-α-α-dicarboxylic acids, substitution products or reactive derivatives thereof forming the parent materials of the invention may be made by various processes from simple naphthalene derivatives.

The derivatives of naphthalene-1.4.5.8-tetracarboxylic acid obtainable according to the invention are intended for use as such in the manufacture of dyestuffs: they may serve as valuable intermediate products. They are, for instance, easily converted into the corresponding tetracarboxylic acid anhydride or the free tetracarboxylic acid by heating with a concentrated acid (cf. the U. S. P. application Serial No. 482,154 for "a process of preparing 1.4.5.8-naphthalene-tetra-carboxylic acid and substitution products thereof" filed on September 15, 1930, in the name of Heinrich Greune and Wilhelm Eckert).

The following examples illustrate the invention, the parts being by weight:

1. 28.5 parts of 5.8-dichloronaphthalene-1.4-dicarboxylic acid (obtainable by chlorinating 1.4-dicyano-naphthalene and boiling the 5.8-dichloro-1.4-dicyano-naphthalene so obtained, melting at 267° C., with dilute sulphuric acid), 200 parts of water, 10 parts of cuprous cyanide and 50 parts of potassium cyanide are heated for 5 hours to 200° C. in an autoclave provided with a stirrer. The solution is then allowed to cool to about 100° C., filtered by suction and the mass remaining on the filter is washed with a small quantity of water. In order to remove any copper compound which may still be present, the residue is extracted with boiling nitric acid; alternatively, it may be dissolved in a very dilute alkali solution, if desired with addition of a small quantity of sodium hydrosulfite, the solution filtered, and the reaction product precipitated from

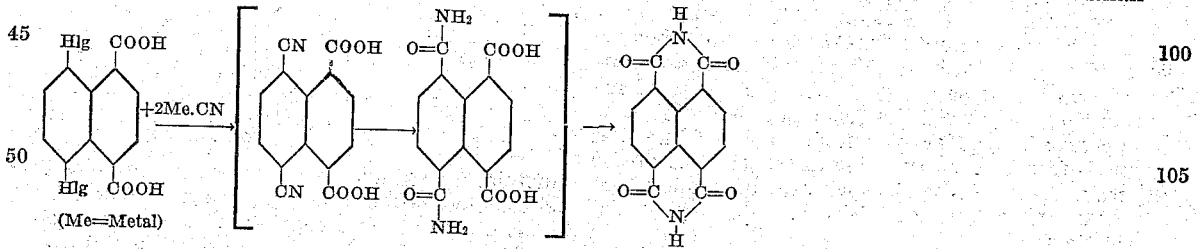

the filtrate by means of an acid. The di-imide thus obtained is identical with the naphthalene-tetra-carboxylic acid di-imide described by Bamberger & Phillip in "Annalen der Chemie", vol. 240, pages 187–188, and has the properties therein referred to. On the addition of a small quantity of sodium hydrosulfite to a hot suspension or solution of the di-imide in aqueous alkali, there is produced a carmine-red solution having a red fluorescence.

From the brownish-yellow filtrate of the original reaction mixture there may be isolated besides a small quantity of free naphthalene-tetra-carboxylic acid a smaller quantity of a reaction product which is soluble in alkali and dissolves in concentrated sulfuric acid to a yellow solution having an intense green fluorescence. The constitution of the compound thus obtained is not certain, but the compound is probably related to the compounds supposed to be formed as intermediate products in the course of the reaction.

In an analogous manner, 4.8-dichloronaphthalene-1.5-dicarboxylic acid may be caused to react with alkali cyanide and cuprous cyanide; the reaction, likewise yields the di-imide of naphthalene-1.4.5.8-tetracarboxylic acid.

The 4.8-dichloronaphthalene-1.5-dicarboxylic acid above referred to may be obtained by causing chloracetyl-chloride to act upon 1.5-dichloronaphthalene in the presence of aluminium chloride and oxidizing the 1.5-dichloro-acetyl-4.8-dichloronaphthalene thus obtained (melting at 245° C.) by means of sodium hypochlorite solution or potassium permanganate. The 4.8-dichloro-naphthalene-1.5-dicarboxylic acid crystallizes from a large quantity of hot water in small colorless needles melting above 330° C.

2. 37 parts of 5.8-dibromo-naphthalene-1.4-dicarboxylic acid (obtainable by bromination of naphthalene-1.4-dicarboxylic acid in chlorosulfonic acid with addition of iodine) are heated in an autoclave for 8 hours at 220° C. with 15 parts of cuprous cyanide and 50 parts of sodium cyanide in 200 parts of water. After cooling, the whole is filtered by suction and the solid matter is washed. The naphthalene-1.4.5.8-tetracarboxylic acid di-imide which is present in the mass remaining on the filter is purified in the manner indicated in Example 1.

3. 25 parts of 5.8-dichloro-1.4-dicyano-naphthalene (obtainable by chlorination of naphthalene-1.4-dicyanide and crystallizing from chlorobenzene in the form of nearly colorless needles, melting at 267° C.), 20 parts of cuprous cyanide, 50 parts of potassium cyanide and 200 parts of water are heated in an autoclave for 10 hours at 200° C. The whole is then allowed to cool, filtered by suction and the solid matter remaining on the filter is treated in the manner indicated in Example 1. There is obtained the feebly yellow di-imide of naphthalene-1.4.5.8-tetracarboxylic acid. By acidifying the filtrate and purifying the light brown precipitate which separates, a small quantity of free naphthalene-1.4.5.8-tetracarboxylic acid may be obtained. The reaction may be conducted in the same way when there is used instead of the nitrile, the 5.8-dichloronaphthalene-1.4-dicarboxylic acid diamide (colorless needles from nitrobenzene, melting above 360° C.) or the ethyl ester of the 5.8-dichloronaphthalene-1.4-dicarboxylic acid (colorless needles from glacial acetic acid).

4. 37 parts of 5.8-dibromonaphthalene-1.4-dicarboxylic acid, 150 parts of water, 25 parts of cuprous cyanide and 20 parts of potassium cyanide are boiled in a reflux apparatus for 6 hours. The whole is filtered by suction and the mass remaining on the filter is treated with hydrochloric acid and a chlorate so as to remove any copper compound. The tetracarboxylic acid di-imide thus obtained is nearly colorless.

Instead of the free dibromonaphthalene-dicarboxylic acid its sodium salt may also be used.

5. Into a boiling suspension of 4 parts of cuprous cyanide in 30 parts of benzylcyanide there is slowly run a boiling solution of 7.5 parts of 5.8-dibromonaphthalene-1.4-dicarboxylic acid in 30 parts of benzylcyanide. The cuprous cyanide quickly dissolves whereupon boiling is continued for a short time. The whole is then allowed to cool, filtered by suction and the residue remaining on the filter is treated with concentrated nitric acid, whereby a solution is obtained. By diluting this solution with water, the tetracarboxylic acid di-imide is precipitated in a practically pure state.

We claim:

1. The process which comprises heating at a temperature of between about 100° C. and about 300° C. a compound of the general formula:

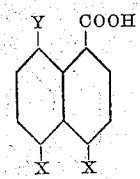

wherein Y stands for a halogen atom and one X represents a carboxylic acid group and the other X a halogen atom with cuprous cyanide, at least one of the reaction components being dissolved in a dissolving agent.

2. The process which comprises heating at a temperature of between about 100° C. and about 300° C. a compound of the general formula:

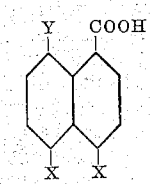

wherein Y stands for a halogen atom and one X represents a carboxylic acid group and the other X a halogen atom with cuprous cyanide in the presence of a dissolving agent of the group consisting of an organic solvent, an aqueous solution of an alkali metal cyanide and an aqueous solution of an alkali metal halide.

3. The process which comprises heating at a temperature of between about 100° C. and about 300° C. a compound of the formula:

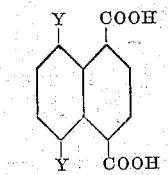

wherein Y stands for a halogen atom with cuprous cyanide in the presence of a dissolving agent of the group consisting of an organic solvent, an aqueous solution of an alkali metal cyanide and an aqueous solution of an alkali metal halide.

4. The process which comprises heating for some hours at a temperature of about 200° C. 5.8-dichloronaphthalene-1.4-dicarboxylic acid with cuprous cyanide in the presence of an aqueous solution of potassium cyanide in an autoclave provided with a stirrer.

5. The process which comprises heating for some hours at a temperature of about 220° C. 5.8-dibromonaphthalene-1.4-dicarboxylic acid with cuprous cyanide in the presence of an aqueous solution of sodium cyanide in an autoclave provided with a stirrer.

GEORG KRÄNZLEIN.
HEINRICH VOLLMANN.